United States Patent

Conboy et al.

[11] Patent Number: 5,838,566
[45] Date of Patent: Nov. 17, 1998

[54] SYSTEM AND METHOD FOR MANAGING EMPTY CARRIERS IN AN AUTOMATED MATERIAL HANDLING SYSTEM

[75] Inventors: Michael R. Conboy, Buda; Elfido Coss, Jr., Austin, both of Tex.

[73] Assignee: Advanced Micro Devices

[21] Appl. No.: 763,233

[22] Filed: Dec. 10, 1996

[51] Int. Cl.$^6$ ....................................... G06F 19/00
[52] U.S. Cl. ................................ 364/468.22; 364/468.13; 364/468.19; 364/468.28; 364/478.03; 364/478.13; 364/478.16
[58] Field of Search ............................... 364/131, 468.02, 364/468.03, 468.13, 468.15, 468.16, 468.19, 468.2, 468.22, 468.23, 468.24, 468.28, 478.02, 478.03, 478.13, 478.16; 414/253, 273, 274

[56] References Cited

U.S. PATENT DOCUMENTS

| | | | |
|---|---|---|---|
| 5,303,214 | 4/1994 | Kulakowski et al. | 369/34 |
| 5,751,581 | 5/1998 | Tau et al. | 364/468 |

*Primary Examiner*—Paul P. Gordon
*Attorney, Agent, or Firm*—Kevin L. Daffer; Conley, Rose & Tayon

[57] ABSTRACT

A system and method for managing empty carriers in an automated material handling system. The system includes a plurality of material carriers, some of which are empty, and a plurality of stock areas which store the carriers while waiting for the contained material to be processed or after having been processed. The system also includes a transportation system for moving the carriers between the stock areas. The system also includes a control system which receives status information from the transportation system and stock areas and controls the movement of carriers, in particular empty carriers, within the system in order to avoid production inefficiencies due to time delays introduced by an empty carrier not being available at a stock area when needed. The control system accomplishes this by calculating status variables, such as the empty percentage of each stock area, the current move rate of carriers in the system, and the current empty move rate in the system. The control system controls the movement of empty carriers based on the status information in relation to control parameters. The empty carrier control system attempts to keep the empty percentage of each stock area within a range defined by minimum and maximum empty percentage control parameters. The empty carrier movement is performed subject to not exceeding a maximum system move rate control parameter, which serves to avoid exceeding the physical limitations of the system, and not exceeding a maximum empty carrier move rate control parameter, which serves as a damping factor to avoid introducing system instability. In one embodiment, the system is for handling semiconductor wafers. In one embodiment, the control system is a network of computers executing a distributed software application for controlling the empty carrier movement.

47 Claims, 5 Drawing Sheets

SYSTEM AND METHOD FOR MANAGING EMPTY CARRIERS IN AN AUTOMATED MATERIAL HANDLING SYSTEM

BACKGROUND OF THE INVENTION

1. Field of the Invention

This invention relates to automated material handling systems and in particular to the management of empty carriers in automated material handling systems.

2. Description of the Relevant Art

Systems which handle material, such as manufacturing facilities, often employ automated material handling systems to move various materials from one location to a another location within the system. The materials may include raw materials, finished product materials, or any materials in between. It is common to employ containers or carriers to move the materials from one location to another during the manufacturing process. Typically, a transportation system is employed, such as a conveyor belt system, for moving the carriers from one processing location to another within the system. Typically, empty containers are needed at the various process locations for placing processed materials into. Likewise, empty containers are generated as materials in such a system, empty carriers are generated as materials are removed from a carrier in order to be processed. Empty containers may also be added or removed from the system.

An example of such a manufacturing facility is a facility for fabricating integrated circuits on semiconductor wafers. The facility may include a plurality of wafer fabrication process tools which perform various fabrication process steps on lots of semiconductor wafer lots. Each process tool typically has an accompanying stock area for storing carriers of wafers waiting to be processed by the tool or having already been processed by the tool. Wafer carriers also referred to as cassettes or "boats". The process tools need empty wafer carriers, for example, to place the processed wafers into after the process tool has performed a wafer fabrication operations. Conversely, as process tools remove wafers from a carrier for processing, empty carriers are generated.

Typically in an integrated circuit manufacturing facility, the requests for moves of empty carriers is very non-linear. The non-linearity is introduced, for example, by the start of the processing of many new wafer lots which suddenly creates the need for a large number of empty carriers. In addition, a situation may occur in which a process tool fails and causes a "log jam" of sorts in the system, thereby consuming a large number of empty carriers, i.e., preventing empty carriers from being generated. In such a situation, empty carriers become a precious resource.

Typically, if an empty carrier is not available when needed by a process tool, for example, an empty carrier must be moved from another location in the system to fulfill the need for the empty carrier. The move of the empty carrier from the other location to the location where the empty carrier is needed imposes a time delay in the process of fabricating a wafer lot. The time delay may introduce inefficient use of the process tool needing the empty carrier. The cumulative cost of many such inefficiencies may be substantial in a large semiconductor fabrication facility including process equipment which is very expensive to purchase, operate and maintain.

One potential solution to the problem is to provide a relatively large number of empty carriers in order to minimize the delay times. This solution may be prohibitive both in terms of storage costs and carrier costs.

Therefore, an improved method for managing empty carriers in an automated material handling system is desired which reduces cost by reducing the number of empty carriers required, reducing the number of carrier moves in the system, reducing the number and/or size of stock areas, and improving the production efficiency of the system.

SUMMARY OF THE INVENTION

The problems outlined above are in large part solved by an improved system and method for managing empty carriers in an automated material handling system hereof. In one embodiment, the system includes a plurality of semiconductor wafer carriers, some of which may be empty at any given point in time, a plurality of tools for processing wafers carried in the carriers, a plurality of stock areas for storing the wafers after being processed by the tools or while waiting for the tools to process the wafers, and a transportation system which moves the carriers between the stock areas. In particular, the transportation system moves empty carriers within the system in order to reduce the number of empty carriers required, reduce the number of carrier moves in the system, reduce the number and/or size of the stock areas, and improve the production efficiency of the system by reducing time delays introduced by not having an empty carrier available when one is needed. The empty carrier management system and method may be extended beyond semiconductor fabrication to management of other types of materials which must be moved from one location to another in order to be processed.

The system further comprises a control system which is coupled to the stock areas. The control system receives event messages from the stock areas which convey status information regarding carriers moved into or out of the stock areas and bins. The control system also sends command messages to the transportation system and stock areas to control the movement of carriers into or out of the stock areas and bins.

In one embodiment, the control system comprises a computer coupled via a serial interface to each of the stock areas for controlling the stock area. Each computer receives event messages via the serial interface from its associated stock area and sends command messages to the stock area via the serial interface. The computers are networked together and to a server. The server includes a database which maintains status information about the inventory of each carrier and bin in the system. The database also maintains a history of the movement of carriers in the system. Each of the computers forwards the event information to the server to keep the database up to date.

The control system queries the database to calculate various status variables. In particular, the control system queries the database to determine an empty percentage for each stock area, i.e., the percentage of bins of the stock area which contain an empty carrier. The control system also queries the database to determine a move rate of carriers within the system, i.e., the number of carriers moved in a given period of time. The control system also queries the database to determine an empty move rate within the system, i.e., the number of moves of empty carriers in a given period of time. The control system calculates the status variables in response to the events received from the stock areas. In one embodiment, the computers maintain a timer which generates timer tick events, wherein the control system calculates the status variables on a periodic basis according to the period of the timer or in combination with the stock area events.

The control system also maintains a set of control parameters regarding the movement of carriers within the system. The control system maintains a minimum and maximum empty percentage control parameter. When the empty percentage for a stock area drops below the minimum empty percentage control parameter, the control system attempts to move an empty carrier into the stock area in order to avoid time delays associated with an empty carrier not being available when needed at the stock area. When the empty percentage for a stock area rises above the maximum empty percentage control parameter, the control system attempts to move an empty carrier out of the stock area to another stock area with an empty bin. Preferably, the minimum and maximum empty percentage is specified for each stock area by an operator of the system in order to benefit from information which the operator may have which is pertinent to the management of empty carriers in the system, such as the knowledge that a new wafer lot is being started or that a process tool has failed.

The control system also maintains a maximum move rate control parameter. If the current move rate of the system is greater than the maximum move rate control parameter, then the control system defers the empty carrier movement which would have been performed in response to the empty percentage. Preferably, the maximum move rate parameter is specified by an operator of the system and serves to avoid "spikes" of carrier moves which may cause use of the system beyond its capabilities, thus producing traffic jams and, consequently, costly production inefficiencies.

The control system also maintains a maximum empty move rate control parameter. If the current empty move rate of the system is greater than the maximum empty move rate control parameter, then the control system defers the empty carrier movement which would have been performed in response to the empty percentage. Preferably, the maximum empty move rate control parameter is specified by an operator of the system and serves as a damping factor to avoid introducing instability in the system due to excessive empty carrier moves.

Broadly speaking, the present invention provides an automated material handling system including a plurality of material carriers each of which may be empty at any given point in time, a plurality of stock areas each having a plurality of bins for storing the carriers, and a transportation system for moving the carriers between the stock areas. The system further includes a control system coupled to the stock areas. The control system maintains control parameters, receives event information from the stock areas, calculates an empty percentage of each of the stock areas in response to the event information, and controls the movement of an empty carriers from a first stock area to a second stock area based on a relationship of the control parameters and the empty percentage of at least one of the first and second stock areas.

BRIEF DESCRIPTION OF THE DRAWINGS

Other objects and advantages of the invention will become apparent upon reading the following detailed description and upon reference to the accompanying drawings in which.

Figure 1:
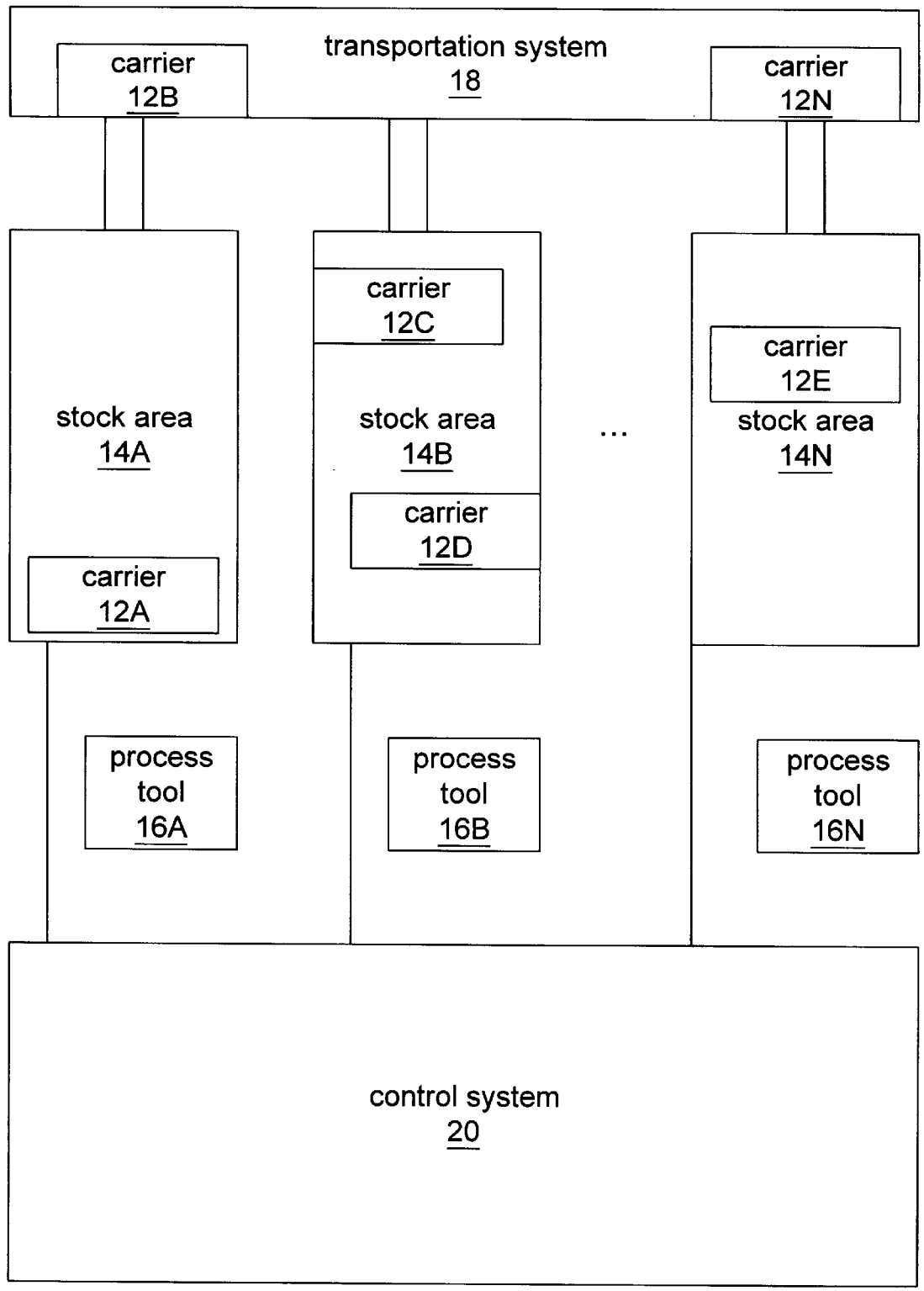
FIG. 1 is a block diagram of an automated wafer carrier handling system according to the preferred embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to FIG. 1, a block diagram of an automated semiconductor wafer handling system 10 is shown. System 10 includes a plurality of wafer carriers 12A through 12N (referred to collectively as 12), a plurality of stock areas 14A through 14N (referred to collectively as 14), and a transportation system 18 which moves the carriers 12 between the stock areas 14 subject to the control of a control system 20, so that semiconductor wafers inside the carriers 12 may be processed by process tools 16A through 16N (referred to collectively as 16) associated with the stock areas 14.

For clarity, a representative wafer carrier will be referred to henceforth as 12A. The carriers 12 are configured to carry semiconductor wafers to various locations within the system 10. At any given point in time, a given carrier 12A may contain wafers or may be empty. In one embodiment, the carrier 12A is a Fluroware 200 mm Peek cassette Model KA200-8-MDA-47c02. In one embodiment, a carrier 12A is configured to carry twenty four semiconductor wafers at a time. The set of wafers contained in the carrier 12A is referred to as a wafer lot, or lot. In one embodiment, the carrier 12A includes a bar code label affixed on the outside of the carrier 12A which uniquely identifies the carrier 12A from the other carriers 12 in the system 10.

The system 10 further includes a plurality of stock areas 14 and an associated plurality of process tools 16. For clarity, a representative stock area will be referred to henceforth as 14A and a representative process tool as 16A. Each of the stock areas 14 include a plurality of bins. Each of the bins is configured to store a wafer carrier 12A. Preferably, stock area 14A bins store empty carriers as well as non-empty carriers, i.e., carriers containing wafers waiting to be processed by an associated process tool or waiting to be sent to another location within the system 10. In one embodiment, the stock area 14A is a Diafuku CLS-40.

The stock area 14A also includes input ports for receiving a carrier 12A. The stock area 14A receives the carrier 12A via its input ports from the transportation system 18. In one embodiment, the stock area 14A receives the carrier 12A via its input ports from a wafer technician. The wafer technician provides the carrier 12A to the stock area 14A typically after receiving the carrier 12A from a process tool 16A after the process tool 16A has performed process operations on the wafers in the carrier 12A. In another embodiment, the transfers of the carrier 12A to the stock area 14A from the process tool 16A are performed automatically. The stock area 14A receives the carrier 12A from an input port and stores the carrier 12A in one of the bins of the stock area 14A.

The stock area 14A includes output ports for dispensing a carrier 12A. The stock area 14A dispenses the carrier 12A via its output ports to a transportation system 18. In one embodiment, the stock area 14A dispenses the carrier 12A via its output ports to a wafer technician. The wafer technician receives the carrier 12A and provides the carrier 12A to a process tool 16A for the process tool 16A to perform process operations on the wafers in the carrier 12A. In another embodiment, the transfers of the carrier 12A from the stock area 14A to the process tool 16A are performed automatically. The stock area 14A removes the carrier 12A from one of its bins and dispenses the carrier 12A to an output port.

Thus, the stock areas 14 act as staging areas for the wafers as the wafers are processed by the process tool 16A. An embodiment is contemplated in which the process tool 16A essentially acts as the stock area, wherein the carrier 12A is moved by the transportation system 18 directly from one process tool to another within the system 10.

In one embodiment, the stock area 14A also includes a bar code reader at each of the input and output ports for reading the bar code on the carrier 12A as the carrier 12A is received or dispensed by the stock area 14A. In one embodiment, the stock area 14A includes a wafer presence sensor which senses the presence of wafers inside the carrier 12A, i.e., which determines whether or not the carrier 12A is empty. The bar code and wafer presence information is included in a message sent by the stock area 14A to the control system 20 when a carrier 12A is received or dispensed by the stock area 14A.

In one embodiment, the stock area 14A includes a serial interface port, such as an RS-232 port, for communicating with a control system 20. In one embodiment, the stock area 14A communicates with the control system 20 over the serial port by exchanging messages. In one embodiment, the messages conform substantially to the SECS-I and/or SECS-II (Semiconductor Equipment Communications Standard) protocol. The messages include event information which the stock area 14A sends to the control system 20 to notify the control system 20 of events such as receiving, dispensing, storing or removing the carrier 12A. The messages also include command, or control information which the control system 20 sends to the stock area 14A to control the stock area 14A to perform an action such as dispensing, storing or removing the carrier 12A.

At any given point in time, some percentage of the bins in the stock area 14A contain empty carriers. The empty percentage may range from zero percent, i.e., no empty carriers, to one hundred percent, i.e., all empty carriers. If the empty percentage is zero in a given stock area, i.e., no empty carriers are present, when an empty carrier is needed, a time delay is introduced which may cause costly production inefficiency of the system 10. Furthermore, if the empty percentage of the stock area 14A is so high that non-empty carriers cannot be moved to the stock area 14A when necessary, a time delay is introduced in moving one or more of the empty carriers out of the stock area 14A, which may also cause costly production inefficiency of the system 10.

Embodiments are contemplated in which a process tool has more than one associated stock area and in which more than one process tool shares a given stock area. A stock area is intended to include any location in which a plurality of material carriers may be placed or stored. A stock area is further intended to include any location in which the material is processed.

The system 10 further includes a transportation system 18 for moving the carriers 12 between the stock areas 14, and thus between the tools 16. The transportation system 18 also moves the carriers 12 into and out of the system 10 as necessary. In one embodiment, the transportation system 18 includes a monorail system which transports the carriers 12 within, into, and out of the system. The monorail system includes "cars" which transport a carrier 12A along the monorail. In one embodiment, the monorail includes sixteen cars which transport carriers 12 within system 10.

The stock area 14A dispenses the carrier 12A out an output port to a monorail car, the monorail car transports the carrier 12A down the rail, and another stock area 14B receives the carrier 12A in an input port from the monorail car. In one embodiment, the monorail is a Diafuku CLW-25. Thus a move of a carrier 12A within the system 10 is performed from one stock area 14A to another. The transportation system 18 may include any transportation system suitable for moving the material carriers 12 between the stock areas 14 of the system 10.

The system 10 further includes a control system 20 configured to control the movement of the carriers 12 between the stock areas 14 within the system 10. The control system 20 is coupled to the stock areas 14 and receives event information from the stock areas 14 and provides control information to the stock areas 14 for controlling carrier movement.

Figure 1A:
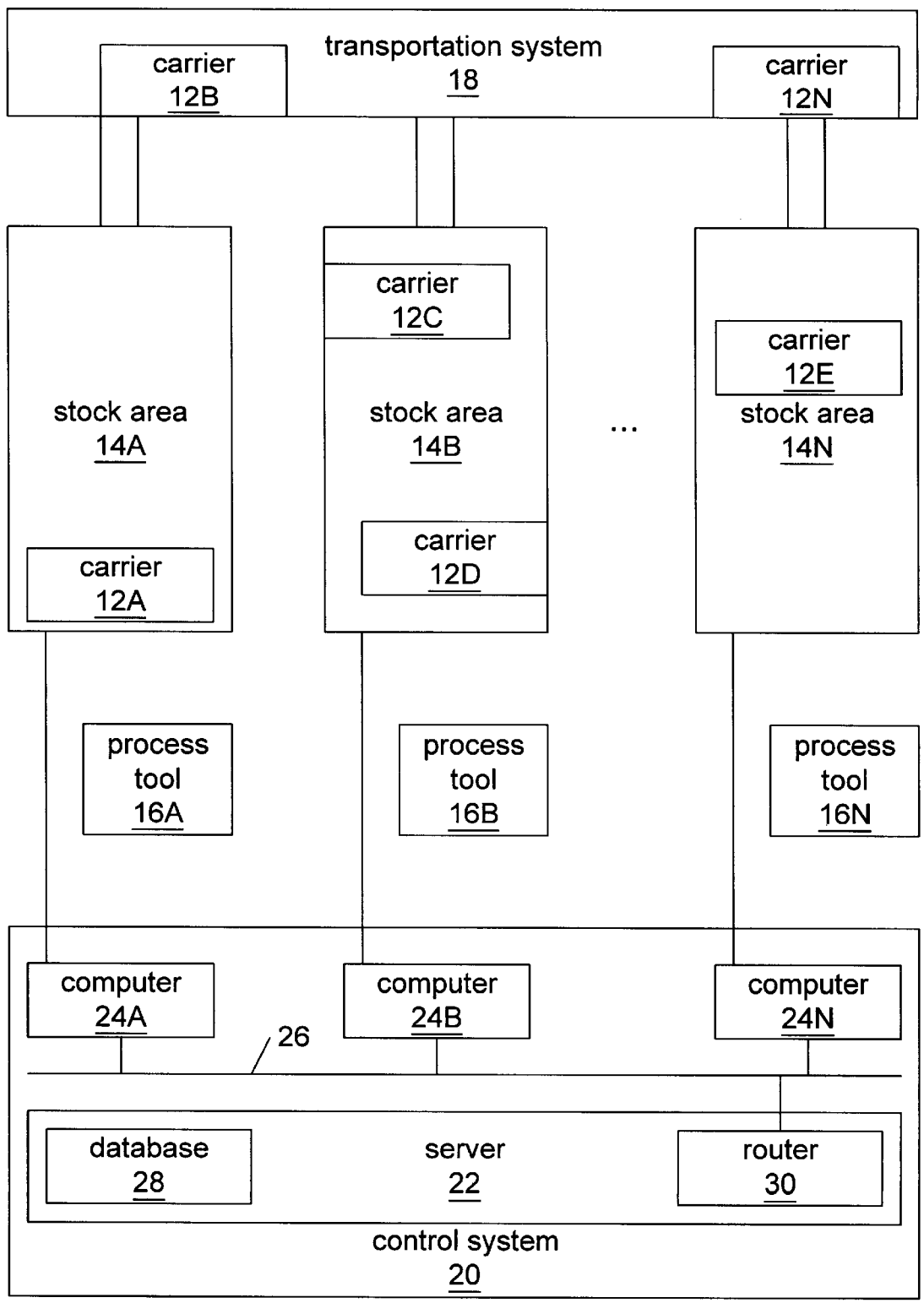
FIG. 1a is a block diagram illustrating one embodiment of the control system of FIG. 1.

Referring now to FIG. 1a, a block diagram of the system of FIG. 1 including a detailed illustration of one embodiment of the control system 20 of FIG. 1 is shown. The system 10 is similar to the system 10 of FIG. 1 and corresponding elements are numbered identically. The control system 20 includes a local area network (LAN) comprising a plurality of computers 24A through 24N (referred collectively as 24), each coupled to an associated one of the stock areas 14. For clarity, a representative computer will be referred to henceforth as 24A.

The computers 24 are coupled to a server 22 via a network media 26, such as an Ethernet cable, twisted-pair cable, or fiber-optic cable. In one embodiment, the computer 24A and server 22 are IBM-compatible personal computers including a microprocessor such as the Pentium® processor. The computer 24A and server 22 include elements common to general purpose computers such as a mouse, a keyboard, system memory, permanent storage such as a hard drive, a video display, and network interface device. In one embodiment, the computers 24 and server 22 communicate with each other over the network media via the TCP/IP protocol. The server 22 includes a router 30 which routes network packets between the computers 24 and the server 22 on the network media 26. In one embodiment, the UNIX® operating system runs on the server 22. In one embodiment, the computers 24 and server 22 execute a distributed software application which controls the stock areas 14 in order to manage the movement of the carriers 12. In one embodiment, the software is Daifuku CFM/CSM revision 2.3A.

The server 22 maintains a database 28 of information relevant to the management of empty carriers in the system 10. In one embodiment, the database 28 is a relational database, such as the Oracle® database or the C-Tree® database. The database 28 contains an inventory of information about each bin in each of the stock areas 14, in particular, whether or not each bin is empty or populated, and if populated by which of the carriers 12. The database 28 also contains an inventory of information about each of the carriers 12 in the system 10, in particular, location and lot information of each of the carriers 12. The lot information includes whether or not the carriers 12 are empty. The database 28 also maintains information regarding the move history of the carriers 12 in the system 10, i.e., source and destination locations, carrier ID, and time associated with each move in the system 10. The database 28 is maintained based on the event information received by the computers 24 which is forwarded to the server 22.

In one embodiment, the computer 24A includes a serial interface port, such as an RS-232 port, for communicating with its associated stock area 14A. Control system 20 preferably communicates with the stock area 14A over the serial port by exchanging messages. In one embodiment, the messages conform substantially to the SECS-I and/or SECS-II (Semiconductor Equipment Communications Standard) protocol. The messages include event information which the stock area 14A sends to the control system 20 to notify the control system 20 of events such as receiving, dispensing, storing or removing the carrier 12A. The messages also include command, or control information which the control system 20 sends to the stock area 14A to control the stock area 14A to perform an action such as dispensing, storing or removing the carrier 12A. The messages are used to control the movement of the carriers 12, including empty carriers, in the system 10.

The computer 24A is configured to calculate an empty percentage for each of its associated stock areas 14, i.e., the percentage of bins of each of the stock areas 14 containing empty carriers; a system move rate, i.e., the number of carriers moved within the system 10 over a period of time referred to as the system move period; and an empty move rate, i.e., the number of empty carriers moved within the system 10 over a period of time referred to as the empty move period. The empty percentage, system move rate, and empty move rate are referred to collectively as status variables.

In one embodiment, the computer 24A includes a timer or clock which generates "timer tick" events, whereby the status variables are determined on a periodic basis according to the period of the timer. In one embodiment, the status variables are determined in response to the events generated by the stock areas 14.

The control system 20 is configured to receive and maintain control parameters related to the management of empty carriers within the system 10. In one embodiment, the empty carrier management parameters include minimum and maximum empty percentage control parameters; a maximum system move rate control parameter; a maximum empty move rate control parameter; the system move time period; and the empty move time period. Preferably, the control parameters may be specified by an operator of the system 10. Preferably, the minimum and maximum empty percentage control parameters may be specified individually for each of the stock areas 14. The control parameters will be described in more detail, infra, with respect to FIG. 2.

Figure 2A:
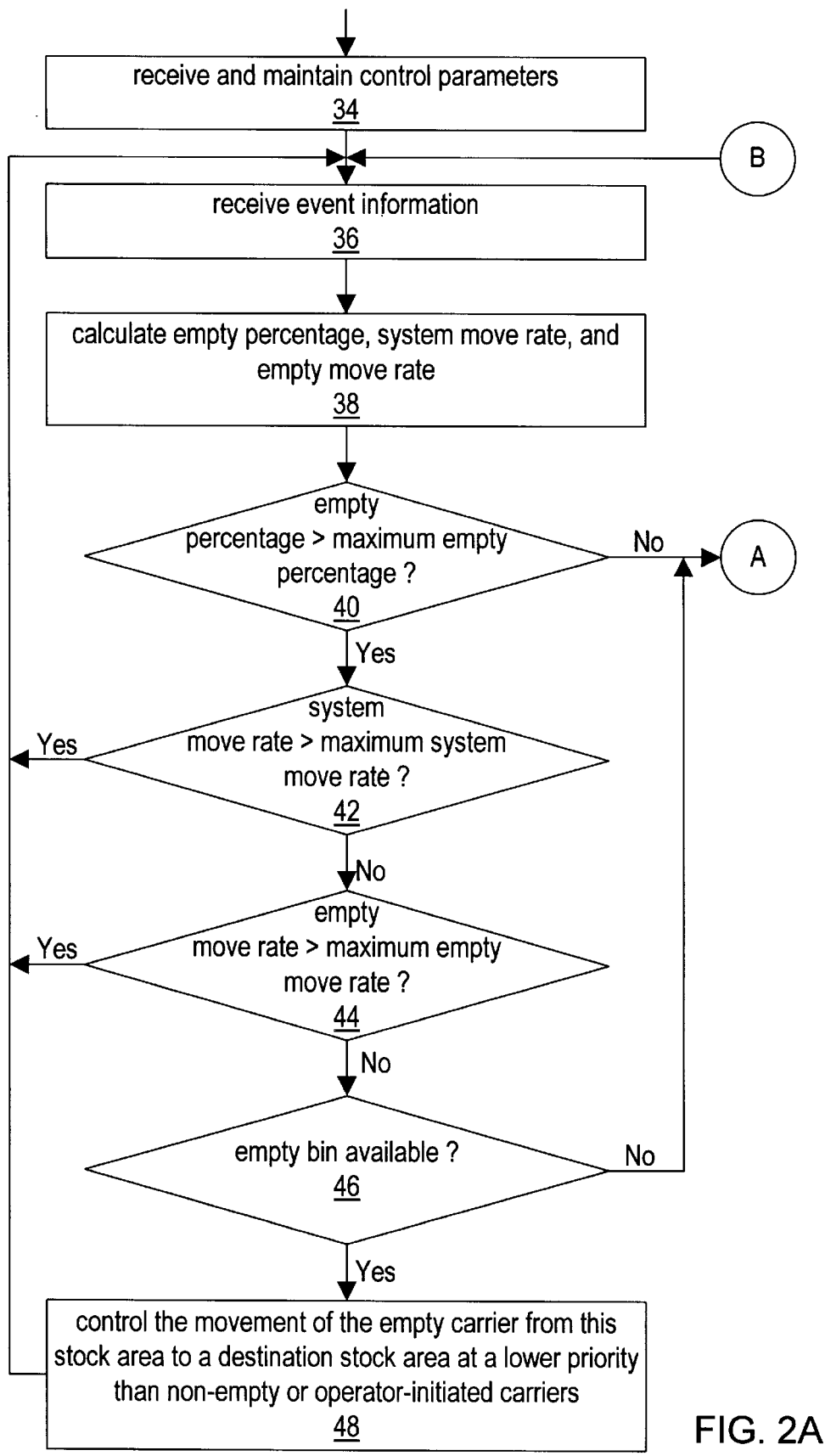
FIGS. 2a and 2b are a flowchart illustrating steps performed in the management of empty carriers in the system of FIG. 1.
Figure 2B:
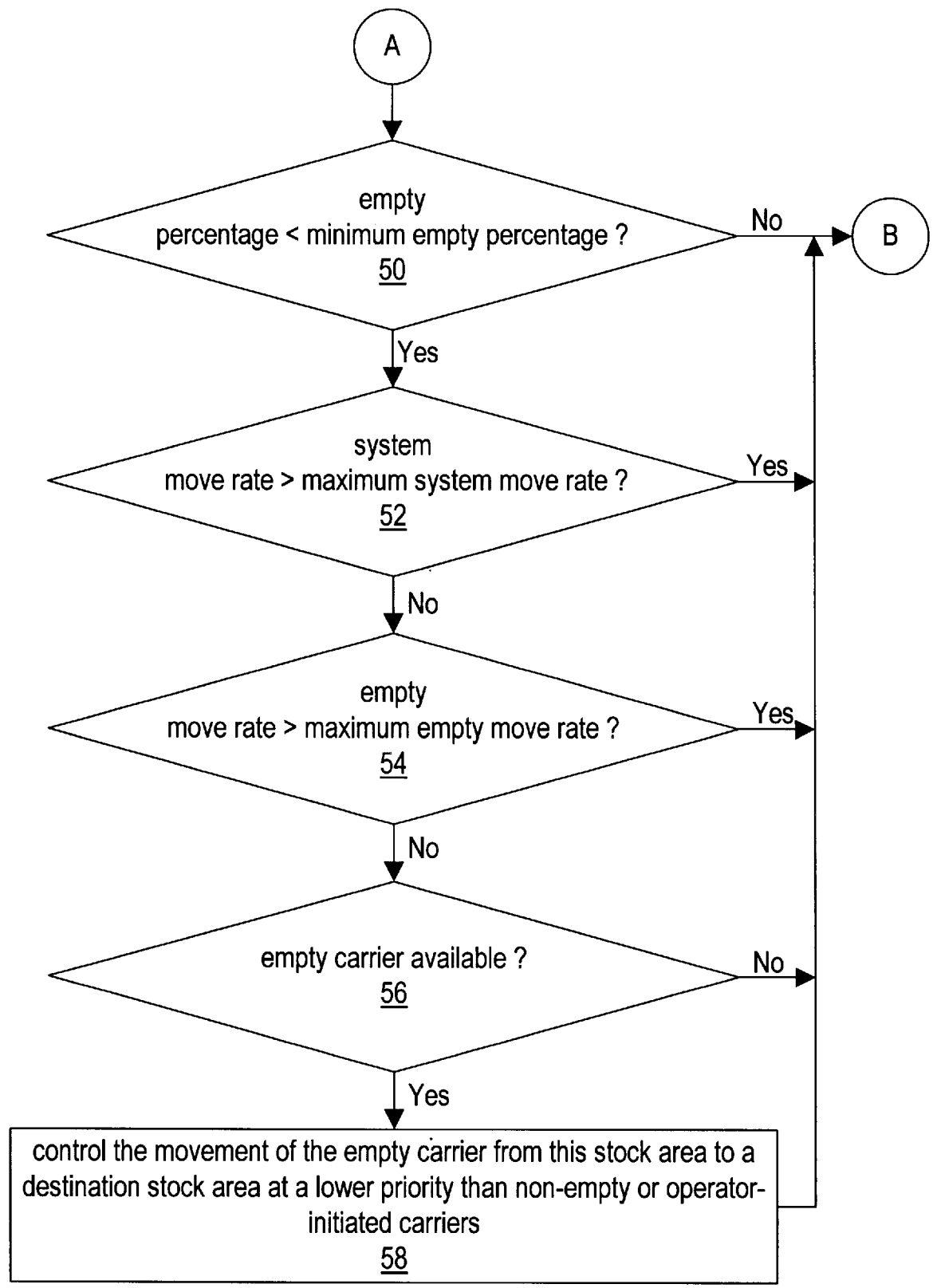

Referring now to FIG. 2 (FIGS. 2a and 2b collectively), a flowchart illustrating steps performed in the management of empty carriers in the system 10 of FIG. 1 is shown. In one embodiment, each computer 24A (of FIG. 1a) of the control system 20 performs the steps described in FIG. 2 for each stock area 14A coupled to the computer 24A upon the occurrence of an event.

The control system 20 receives and maintains the control parameters, in step 34. In one embodiment, the control parameters are variables in a software program which executes on the computers 24 of the control system 20. In one embodiment, the control parameters are "hard-coded" and receiving the control parameters includes receiving the control parameters from a programmer who writes the software program which includes the control parameters as variables or constants. In one embodiment, receiving the control parameters includes receiving the control parameters from an operator of the system 10. The operator inputs values for one or more of the control parameters via an input device of the computer 24A such as a mouse or keyboard. In one embodiment, maintaining the control parameters includes storing the control parameters in a memory of the computer 24A, wherein the control parameters are accessible by the processor of the computer 24A to perform the calculation of the status variables. In one embodiment, the operator may change the values of the control parameters during the operation of the system 10. The function of each of the control parameters is described with respect to pertinent steps of FIG. 2.

The control system 20 waits for an event to occur and receives the event in step 36. In one embodiment, the events which the control system 20 receives are a timer tick, and/or events from the stock areas 14. The timer tick may be used to perform the movement of empty carriers on a periodic basis. Preferably, the time period of the timer may be set by an operator of the system 10. The events from the stock areas 14 are a stock area 14A having received a carrier 12A at an input port, the stock area 14A having provided a carrier 12A to an output port, the stock area 14A having placed the carrier 12A in a bin, and the stock area 14A having removed the carrier 12A from a bin. Preferably, the stock area 14A notifies the computer 24A of an event by sending a message over the serial interface. Preferably, the message includes the bar code information from the carrier 12A, the wafer presence information, i.e., whether or not the carrier 12A is empty, and the bin number.

In one embodiment, the computer 24A provides the event information to the server 22, and the server 22 updates the database 28 in response to the event information. In particular, the server 22 updates the carrier and bin inventory information, as well as the move history information.

Once an event has been received, the control system 20 calculates the status variables, in step 38. Preferably, calculating the status variables includes a computer 24A calculating the status variables in response to an event received by the computer 24A. Preferably, the status variables include: the empty percentage for each of its associated stock areas 14, i.e., the percentage of bins of each of the stock areas 14 containing empty carriers; the system move rate, i.e., the number of carriers moved within the system 10 over a period of time referred to as the system move period; and the empty move rate, i.e., the number of empty carriers moved within the system 10 over a period of time referred to as the empty move period.

Calculating the empty percentage includes querying the database 28 for the number of empty carriers in the stock area 14A, querying the database 28 for the number of bins which the stock area 14A has, and dividing the number of empty carriers by the number of bins.

Calculating the system move rate includes retrieving the system move period parameter, querying the database 28 for the number of moves for all carriers in the system 10 in the past amount of time specified by the system move period parameter, and dividing the number of carrier moves by the system move period of time.

Calculating the empty move rate includes retrieving the empty move period parameter, querying the database 28 for the number of moves for all empty carriers in the system 10 in the past amount of time specified by the empty move period parameter, and dividing the number of empty carrier moves by the empty move period of time.

Once the status variables have been calculated, the control system 20 determines if the empty percentage for the stock area 14A is greater than the maximum empty percentage control parameter, i.e., that the stock area 14A has too many empty carriers, in step 40. If the stock area does not have too many empty carriers, the control system 20 proceeds to step 50 to check to see if the stock area 14A has too few empty carriers.

The values of the maximum and minimum empty percentage control parameters, are chosen to avoid or reduce time delays due to unavailability of empty carriers. Thus, the minimum and maximum empty percentage control parameters and associated empty percentage calculated advantageously provide a range in which the control system 20 attempts to keep the empty percentage of each of the stock areas 14 in order to reduce or eliminate time delays introduced by the unavailability of empty carriers, thereby reducing cost by reducing the number of empty carriers required, reducing the number of carrier moves in the system, reducing the number and/or size of stock areas, and improving the production efficiency of the system.

If the stock area 14A has too many empty carriers, the control system 20 determines if the system move rate of the system 10 is greater than the maximum system move rate control parameter, i.e. if too many carriers have been moved in the current system move time period, in step 42. If too many carriers have been moved in the current system move time period, the control system 20 defers attempting to bring the empty percentage for the stock area 14A below the maximum empty percentage control parameter of the stock area 14A until the next event, and proceeds to step 36 to wait for another event.

The maximum system move rate control parameter is based on the design of the system 10, i.e., based on the physical limitations of the system 10 such as the size and speed of the transportation system 18, the number of stock areas 14, the number of interfaces, response time of the control system 20, and the level of safety constraints. Preferably, the maximum system move rate parameter is set to a value to prevent a spike of carrier movement, which may cause inefficiencies in the flow of carrier traffic on the transportation system 18. Preferably, maximum system move rate control parameter is set to a value to prevent attempting to move carriers 12 in the system 10 beyond its capabilities which may cause failures within the system such as collisions of carriers or gridlock situations.

If the stock area 14A has too many empty carriers, and if too many carriers have not been moved in the current system move time period, the control system 20 determines if the empty move rate of the system 10 is greater than the maximum empty move rate control parameter, i.e. if too many empty carriers have been moved in the current empty move time period, in step 44. If too many empty carriers have been moved in the current empty move time period, the control system 20 defers attempting to bring the empty percentage for the stock area 14A below the maximum empty percentage control parameter of the stock area 14A until the next event, and proceeds to step 36 to wait for another event.

The maximum empty move rate control parameter serves as a damping factor so that the movement of empty carriers does not cause instability of the system 10. For example, an operator of the system 10 may be aware a of change in the work flow of the system about to occur, such as the start of a set of new wafer lots, and in response introduce a large number of empty carriers into the system 10 at a strategic point in the system 10, such as at a crucial stock area 14A. The empty move rate control parameter helps to prevent overreaction of the empty management control system to the introduction of new empty carriers which might cause instability in the system 10.

If the stock area 14A has too many empty carriers, and if too many carriers have not been moved in the current system move time period, and if too many empty carriers have not been moved in the current empty move time period, the control system 20 determines if an empty bin is available in one of the other stock areas 14, in step 46. Preferably, the computer 24A queries the database 28 about the availability of an empty bin in the stock areas 14. If no empty bins are available in the other stock areas 14, the control system 20 defers attempting to bring the empty percentage for the stock area 14A below the maximum empty percentage control parameter of the stock area 14A until the next event, and proceeds to step 50 to check to see if the stock area 14A has too few empty carriers.

If the stock area 14A has too many empty carriers, and if too many carriers have not been moved in the current system move time period, and if too many empty carriers have not been moved in the current empty move time period, and if an empty bin is available in one of the other stock areas 14, the control system 20 controls the movement of an empty carrier from the stock area 14A to the destination stock area having an empty bin, in step 48. The control system 20 moves the empty carrier out of the stock area 14A at a lower priority than "normal" carrier moves, i.e., carriers which are not empty and presumably contain production wafers. The control system 20 also moves the empty carrier out of the stock area 14A at a lower priority than carrier moves which are initiated by an operator of the system 10, i.e., priority is given to the intelligence of the operator over the empty management control system. A more detailed description of step 48 is given, infra, in the discussion of FIG. 3.

In one embodiment, the control system 20 selects one of the other stock areas 14 to move the empty carrier to based upon the empty percentage of the other stock areas 14. In one embodiment, the control system 20 does not move an empty carrier to another stock area whose empty percentage already exceeds its maximum empty percentage control parameter. In one embodiment, the control system moves the empty carrier to another stock area which has the smallest number or percentage of empty bins. In another embodiment, the control system moves the empty carrier to another stock area which has the smallest percentage of empty carriers.

If the stock area 14A does not have too many empty carriers, the control system 20 determines if the empty percentage for the stock area 14A is less than the minimum empty percentage control parameter, i.e., that the stock area 14A has too few empty carriers, in step 50. If the stock area does not have too few empty carriers, the control system 20 returns to step 36 to wait for another event.

If the stock area 14A has too few empty carriers, the control system 20 determines if the system move rate of the system 10 is greater than the maximum system move rate control parameter, in step 52. If too many carriers have been moved in the current system move time period, the control system 20 defers attempting to bring the empty percentage for the stock area 14A above the minimum empty percentage control parameter of the stock area 14A until the next event, and proceeds to step 36 to wait for another event.

If the stock area 14A has too few empty carriers, and if too many carriers have not been moved in the current system move time period, the control system 20 determines if the empty move rate of the system 10 is greater than the maximum empty move rate control parameter, in step 54. If too many empty carriers have been moved in the current empty move time period, the control system 20 defers attempting to bring the empty percentage for the stock area 14A above the minimum empty percentage control parameter of the stock area 14A until the next event, and proceeds to step 36 to wait for another event.

If the stock area 14A has too few empty carriers, and if too many carriers have not been moved in the current system move time period, and if too many empty carriers have not been moved in the current empty move time period, the control system 20 determines if an empty carrier is available in one of the other stock areas 14, in step 56. Preferably, the computer 24A queries the database 28 about the availability of an empty carrier in the other stock areas 14. If no empty carriers are available in the other stock areas 14, the control system 20 defers attempting to bring the empty percentage for the stock area 14A above the minimum empty percentage control parameter of the stock area 14A until the next event, and returns to step 36 to wait for another event.

If the stock area 14A has too few empty carriers, and if too many carriers have not been moved in the current system move time period, and if too many empty carriers have not been moved in the current empty move time period, and if an empty carrier is available in one of the other stock areas 14, the control system 20 controls the movement of an empty carrier from the source stock area having an empty carrier to the stock area 14A, in step 58. The control system 20 moves the empty carrier to the stock area 14A at a lower priority than "normal" carrier moves, i.e., carriers which are not empty and presumably contain production wafers. The control system 20 also moves the empty carrier to the stock area 14A at a lower priority than carrier moves which are initiated by an operator of the system 10, i.e., priority is given to the intelligence of the operator over the empty management control system. A more detailed description of step 58 is given, infra, in the discussion of FIG. 3.

In one embodiment, the control system 20 selects one of the other stock areas 14 to move the empty carrier from based upon the empty percentage of the other stock areas 14. In one embodiment, the control system 20 does not move an empty carrier from another stock area whose empty percentage already is below its minimum empty percentage control parameter. In one embodiment, the control system moves the empty carrier from another stock area which has the greatest number or percentage of empty bins. In another embodiment, the control system moves the empty carrier from another stock area which has the largest percentage of empty carriers.

Figure 3:
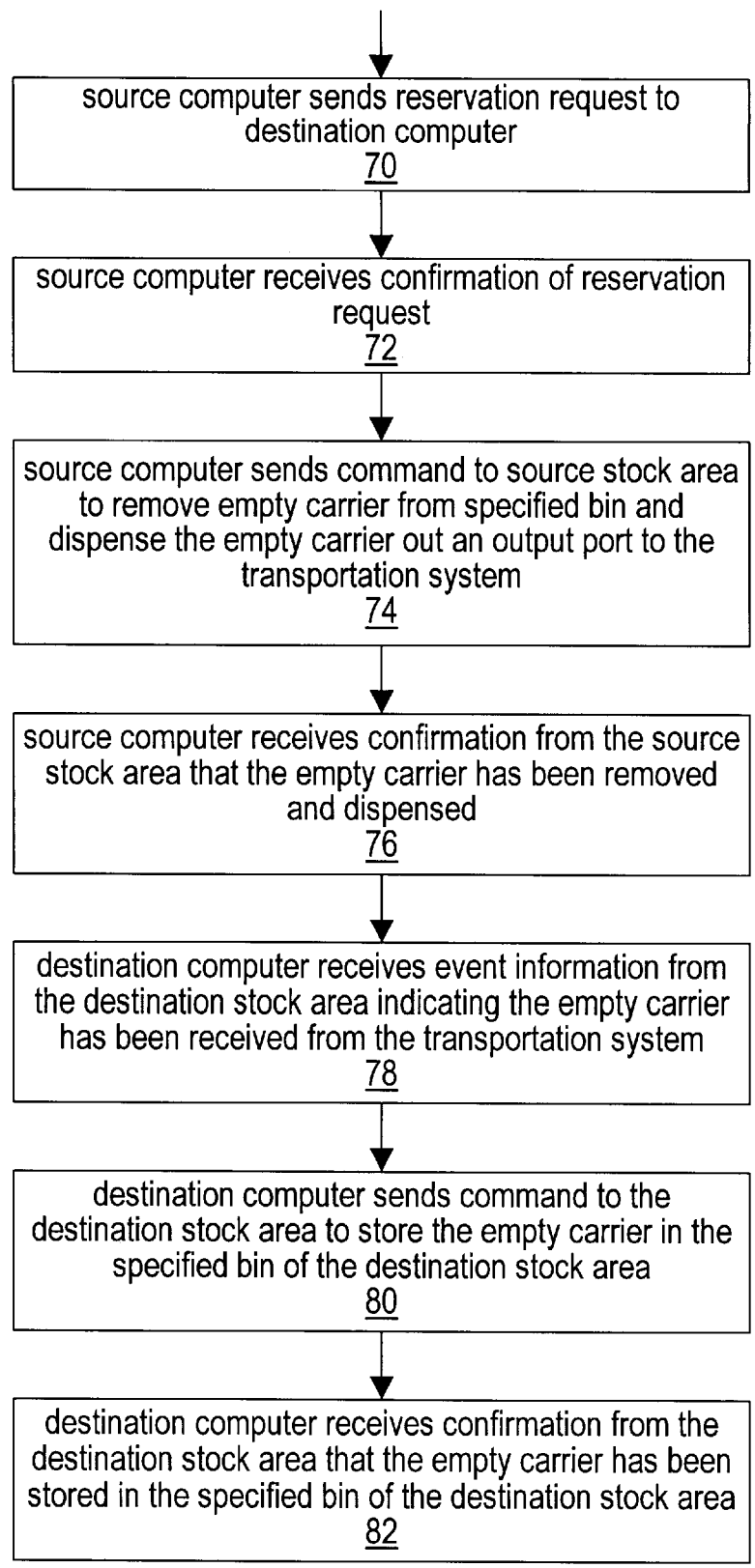
FIG. 3 is a flowchart illustrating steps involved in performing the step of controlling the movement of an empty carrier according to one embodiment of FIG. 2.

Referring now to FIG. 3, a flowchart illustrating steps involved in performing the steps 48 and 58 (of FIG. 2), i.e., controlling the movement of an empty carrier according to one embodiment is shown. The control system 20 determines the source stock area 24A and destination stock area 24B of the move. In the case of step 48, the source stock area 24A is the stock area with too many empty carriers and the destination stock area 24B will receive the empty carrier. In the case of step 58, the destination stock area 24B is the stock area with too few empty carriers and the source stock area 24A will give up an empty carrier.

Preferably, the source computer 24A queries the database 28 to obtain the carrier ID of the empty carrier and the bin number of the bin in which the empty carrier is currently stored. The source computer 24A sends a reservation request to the destination computer 24B coupled to the destination stock area 24B to reserve a bin in the destination stock area 24B, in step 70. Preferably, the empty carrier ID is sent with the reservation request so that the destination computer 24B can confirm the reception of the empty carrier later. When the source computer 24A receives a confirmation of the reservation from the destination computer 24B, in step 72, the source computer 24A sends a command to the source stock area 24A to remove the empty carrier from the specified bin and to dispense the empty carrier to an output port onto the transportation system 18, in step 74.

The source computer 24A provides the carrier ID and bin number to the source stock area 24A in the command. When the source stock area 24A performs the removal and dispensing of the empty carrier, the source stock area 24A reads the bar code label on the empty carrier and confirms a match with the carrier ID specified in the command. Preferably, the command also indicates that the carrier is empty and a wafer presence sensor of the source stock area 24A confirms that the carrier is empty. If the carrier is not empty, an error condition is reported. The source computer 24A later receives a confirmation from the source stock area 24A that the carrier has been removed and dispensed, in step 76.

The empty carrier travels along the transportation system 18 from the source stock area 24A to the destination stock area 24B. The destination computer 24B receives an event message from the destination stock area 24B indicating the arrival and reception of the empty carrier, in step 78. Preferably, the destination stock area 24B reads the bar code label of the empty carrier and performs a wafer presence check on the carrier. The destination computer 24B then sends a command message to the destination stock area 24B to store the empty carrier in the empty bin in the destination stock area 24B for which a reservation was made, in step 80. The destination computer 24B later receives an event message from the destination stock area 24B confirming that the empty carrier has been stored in the specified bin, in step 82. In one embodiment, the communication between the source computer 24A and destination computer 24B is accomplished via the server 22.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An automated material handling system, comprising:

a plurality of material carriers, a first subset of which contain material and a second subset of which are absent material;

a first stock area comprising a plurality of first bins, each of which are configured to store a material carrier drawn from either said first or said second subset;

a control system coupled to the first stock area for computing a first empty percentage calculated as the number of said first bins which contain material carriers from the second subset relative to the number of said first bins; and a transportation system responsive to said control system for moving a material carrier drawn from said second subset between a staging area and the first stock area based on a comparison of the first empty percentage to a predetermined threshold.

2. The automated material handling system as recited in claim 1, wherein said material carriers comprise semiconductor wafer carriers.

3. The automated material handling system as recited in claim 1, wherein said predetermined threshold comprises a range of values which if exceeded by said first empty percentage causes movement of a material carrier drawn from said second subset away from said first stock area.

4. The automated material handling system as recited in claim 1, wherein said predetermined threshold comprises a range of values which if the first empty percentage is less than the range of values causes movement of a material carrier drawn from said second subset to said first stock area.

5. The automated material handling system as recited in claim 1, wherein said staging area comprises a second stock area comprising a plurality of second bins, each of which are configured to store a material carrier drawn from either said first or said second subset, wherein said control system is coupled to the second stock area.

6. The automated material handling system as recited in claim 1, wherein said control system comprises a network of computers, wherein each of said computers is coupled to at least one of said first and stock areas.

7. The automated material handling system as recited in claim 1, wherein said network of computers executes a distributed software application for controlling the movement of said material carrier drawn from said second subset between said staging area and the first stock area.

8. The automated material handling system as recited in claim 1, wherein said predetermined threshold is maintained for each of said first and second stock areas.

9. The automated material handling system as recited in claim 1, wherein said predetermined threshold is configurable by an operator of said system.

10. The automated material handling system as recited in claim 1, wherein said control system is configured to calculate a system move rate as the number of said plurality of material carriers moved by said transportation system per a predetermined time period.

11. The automated material handling system as recited in claim 10, wherein said material carrier drawn from said second subset between the staging area and the first stock area only if said system move rate is less than a predetermined value.

12. The automated material handling system as recited in claim 11, wherein said predetermined value is configurable by an operator of said system.

13. The automated material handling system as recited in claim 10, wherein said predetermined time period is configurable by an operator of said system.

14. The automated material handling system as recited in claim 1, wherein said control system computes said first empty percentage in response to at least one event chosen from a list consisting of a timer tick, the first stock area receiving one of said plurality of material carriers, the first stock area dispensing one of said plurality of material carriers, the first stock area storing one of said plurality of material carriers in one of said plurality of first bins, the first stock area removing one of said plurality of material carriers from one of said plurality of first bins.

15. The automated material handling system as recited in claim 1, wherein said material carrier drawn from said second subset is moved only at a lower priority than the movement of a material carrier drawn from said first subset.

16. The automated material handling system as recited in claim 1, wherein said material carrier drawn from said second subset is moved only at a lower priority than the movement of a material carrier which is initiated by an operator of said system.

17. The automated material handling system as recited in claim 1, wherein said control system is configured to calculate an empty move rate as the number of said plurality of material carriers drawn from said second subset moved by said transportation system per a pre-determined time period.

18. The automated material handling system as recited in claim 17, wherein said material carrier drawn from said second subset between the staging area and the first stock area only if said empty move rate is less than a pre-determined value.

19. The automated material handling system as recited in claim 18, wherein said predetermined value is configurable by an operator of said system.

20. The automated material handling system as recited in claim 17, wherein said predetermined time period is configurable by an operator of said system.

21. A method for managing empty material carriers in an automated material handling system comprising a plurality of material carriers, a plurality of stock areas, wherein each of the plurality of stock areas includes a plurality of bins for storing a portion of the plurality of material carriers, wherein each of said plurality of stock areas has an associated empty percentage, wherein said empty percentage is a percentage of said plurality of bins storing one of said plurality of material carriers which is empty, a transportation system for moving the plurality of material carriers between the plurality of stock areas, and a control system coupled to the plurality of stock areas, the method comprising:
   maintaining at least one control parameter;
   receiving event information from said plurality of stock areas;
   calculating an empty percentage for each of said plurality of stock areas in response to said event information;
   determining the relationship of said at least one control parameter and said empty percentage of at least one of said first and second of said plurality of stock areas; and
   controlling the movement of an empty one of said plurality of material carriers from a first of said plurality of stock areas to a second of said plurality of stock areas based on said relationship.

22. The method of claim 21, wherein said material carriers comprise semiconductor wafer carriers.

23. The method of claim 21, wherein said maintaining comprises maintaining a minimum empty percentage control parameter.

24. The method of claim 23, wherein said determining comprises determining if said empty percentage of said first of said plurality of stock areas is less than said minimum empty percentage control parameter.

25. The method of claim 23, wherein said controlling comprises controlling said movement of said empty carrier if said empty percentage of said first of said plurality of stock areas is less than said minimum empty percentage control parameter.

26. The method of claim 23, wherein said maintaining comprises maintaining said minimum empty percentage control parameter for each of said plurality of stock areas.

27. The method of claim 23, further comprising receiving said minimum empty percentage control parameter in response to operator input.

28. The method of claim 21, wherein said maintaining comprises maintaining a maximum empty percentage control parameter.

29. The method of claim 28, wherein said determining comprises determining if said empty percentage of said first of said plurality of stock areas is greater than said maximum empty percentage control parameter.

30. The method of claim 29, wherein said controlling comprises controlling said movement of said empty carrier if said empty percentage of said second of said plurality of stock areas is greater than said maximum empty percentage control parameter.

31. The method of claim 28, wherein said maintaining comprises maintaining said maximum empty percentage control parameter for each of said plurality of stock areas.

32. The method of claim 28, further comprising receiving said maximum empty percentage control parameter in response to operator input.

33. The method of claim 21, further comprising calculating a system move rate in response to said receiving event information, wherein said calculating said system move rate comprises dividing a number of said plurality of material carriers moved by said transportation system by a system move time period.

34. The method of claim 33, wherein said maintaining comprises maintaining a maximum system move rate control parameter.

35. The method of claim 34, wherein said determining comprises determining if said system move rate is less than said maximum system move rate control parameter.

36. The method of claim 35, wherein said controlling comprises controlling said movement of said empty carrier only if said system move rate is less than said maximum system move rate control parameter.

37. The method of claim 34, further comprising receiving said maximum system move rate control parameter in response to operator input.

38. The method of claim 33, further comprising receiving said system move time period in response to operator input.

39. The method of claim 21, further comprising calculating an empty move rate in response to said receiving event information, wherein said calculating said empty move rate comprises dividing a number of said plurality of material carriers which are empty moved by said transportation system by an empty move time period.

40. The method of claim 39, wherein said maintaining comprises maintaining a maximum empty move rate control parameter.

41. The method of claim 40, wherein said determining comprises determining if said empty move rate is less than said maximum empty move rate control parameter.

42. The method of claim 41, wherein said controlling comprises controlling said movement of said empty carrier only if said empty move rate is less than said maximum empty move rate control parameter.

43. The method of claim 40, further comprising receiving said maximum empty move rate control parameter in response to operator input.

44. The method of claim 39, further comprising receiving said empty move time period in response to operator input.

45. The method of claim 21, wherein said event information includes information regarding at least one event chosen from a list consisting of a timer tick, one of said plurality of stock areas receiving one of said plurality of carriers, one of said plurality of areas dispensing one of said plurality of carriers, one of said plurality of stock areas storing one of said plurality of carriers in one of said plurality of bins, one of said plurality of stock areas removing one of said plurality of carriers from one of said plurality of bins.

46. The method of claim 21, wherein said controlling comprises controlling said movement of said empty carrier only at a lower priority than one of said plurality of material carriers which is not empty.

47. The method of claim 21, wherein said controlling comprises controlling said movement of said empty carrier only at a lower priority than one of said plurality of material carriers the movement of which is initiated by an operator of said system.

\* \* \* \* \*